(12) United States Patent
Wakatsuki et al.

(10) Patent No.: US 10,930,960 B2
(45) Date of Patent: Feb. 23, 2021

(54) FUEL CELL SYSTEM

(71) Applicant: TOYOTA JIDOSHA KABUSHIKI KAISHA, Toyota (JP)

(72) Inventors: Kazutoshi Wakatsuki, Toyota (JP); Katsuya Komaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/517,734

(22) Filed: Jul. 22, 2019

(65) Prior Publication Data

US 2020/0083552 A1 Mar. 12, 2020

(30) Foreign Application Priority Data

Sep. 12, 2018 (JP) .............................. JP2018-170935

(51) Int. Cl.
*H01M 8/0662* (2016.01)
*H01M 8/0432* (2016.01)
*H01M 8/04007* (2016.01)
*H01M 8/04701* (2016.01)
*H01M 8/04746* (2016.01)

(52) U.S. Cl.
CPC ....... *H01M 8/0662* (2013.01); *H01M 8/0435* (2013.01); *H01M 8/04074* (2013.01); *H01M 8/04343* (2013.01); *H01M 8/04701* (2013.01); *H01M 8/04761* (2013.01)

(58) Field of Classification Search
CPC ........... H01M 8/0662; H01M 8/04343; H01M 8/0435; H01M 8/04074; H01M 8/04701; H01M 8/04761
See application file for complete search history.

(56) References Cited

U.S. PATENT DOCUMENTS

2013/0059216 A1* 3/2013 Kim .................. H01M 8/04067
429/414

FOREIGN PATENT DOCUMENTS

JP 2009-191333 8/2009
JP 2010-153246 7/2010

* cited by examiner

*Primary Examiner* — Stewart A Fraser
(74) *Attorney, Agent, or Firm* — Oblon, McClelland, Maier & Neustadt, L.L.P.

(57) ABSTRACT

In fuel cell system, exhaust material M exhausted from a fuel cell stack flows through the exhaust pipe. The gas-liquid separator is provided at the exhaust pipe and separates the exhaust material M into gas and liquid. The connecting pipe is connected to an exhaust port of the gas-liquid separator. The pressure regulating valve is connected to the connecting pipe and regulates pressures of the gas such that a pressure of the gas at an upstream side is higher than atmospheric pressure. The guide pipe is connected at the downstream side of the pressure regulating valve and guides at least the gas toward the exhaust pipe. The heat exchange unit exchanges heat between the exhaust pipe and the guide pipe.

4 Claims, 10 Drawing Sheets

FUEL CELL SYSTEM

CROSS-REFERENCE TO RELATED APPLICATION

This application is based on and claims priority under 35 USC 119 from Japanese Patent Application No. 2018-170935 filed on Sep. 12, 2018, the disclosure of which is incorporated by reference herein.

BACKGROUND

Technical Field

The present disclosure relates to a fuel cell system.

Related Art

Japanese Patent Application Laid-Open (JP-A) No. 2010-153246 discloses a fuel cell system in which a catch tank is provided that stores generated water flowing out from a fuel cell.

JP-A No. 2009-191333 discloses a structure in which a cooler disposed at an upstream side of a gas-liquid separator is used to lower the temperature of and liquefy a water component included in hydrogen flowing to the gas-liquid separator, and the water component is removed by the gas-liquid separator.

In a fuel cell, hydrogen and air are fed in, and electricity is generated by a chemical reaction between hydrogen and oxygen. Exhaust material is exhausted from the fuel cell. The exhaust material contains gases that are not consumed by the chemical reaction in the fuel cell (including oxygen and nitrogen) and liquids (including water vapor and liquid water). The gases and liquids are separated by the exhaust material being passed through a gas-liquid separator.

However, when a catch tank simply stores liquid water flowing out from a fuel cell as in the fuel cell system disclosed in JP-A No. 2010-153246, water vapor may flow to a downstream side of the gas-liquid separator as a gas, and it is difficult to increase liquid water recovery amounts. Meanwhile, in a structure in which a cooler is separately provided at the upstream side of a gas-liquid separator and cools exhaust material in order to increase liquid water recovery amounts as in the structure disclosed in JP-A No. 2009-191333, large amounts of electrical energy are required to operate the cooler, and energy consumption increases. Thus, there is scope for improvement in providing a fuel cell system that may both suppress an increase in energy consumption and increase liquid water recovery amounts.

SUMMARY

In consideration of the circumstances described above, the present disclosure provides a fuel cell system that may both suppress an increase in energy consumption and increase liquid water recovery amounts.

A fuel cell system according to a first aspect of the present disclosure includes an exhaust pipe through which exhaust material exhausted from a fuel cell flows, a gas-liquid separator connected to the exhaust pipe, the gas-liquid separator separating the exhaust material into gas and liquid, a connecting pipe connected to an exhaust port of the gas-liquid separator, at least the gas being exhausted through the exhaust port, a pressure regulation unit connected to the connecting pipe, the pressure regulation unit regulating pressures of the gas such that a pressure of the gas at an upstream side of the pressure regulation unit is higher than atmospheric pressure, a guide pipe that is connected to the downstream side of the pressure regulation unit or that is connected to the pressure regulation unit via a joining pipe, the guide pipe guiding at least the gas toward the exhaust pipe, and a heat exchange unit that exchanges heat between the exhaust pipe and the guide pipe.

In the fuel cell system according to the first aspect of the present disclosure, exhaust material exhausted from the fuel cell is separated into gas and liquid at the gas-liquid separator. The liquid is recovered as liquid water, and at least the gas passes through the gas-liquid separator and flows to the pressure regulation unit at the downstream side. At the pressure regulation unit, the gas pressures are regulated such that the pressure of the gas at the upstream side, including the connecting pipe, is higher than atmospheric pressure. Because the pressure of the gas that has passed through the pressure regulation unit is lower, the temperature of the gas falls in accordance with the Joule-Thomson effect.

The gas whose temperature has been lowered is guided by the guide pipe toward the exhaust pipe. At the heat exchange unit, heat is exchanged between the exhaust pipe and the guide pipe. More specifically, heat is exchanged between the high-temperature exhaust material flowing in the exhaust pipe and the low-temperature gas flowing through the guide pipe. Thus, the temperature of the high-temperature exhaust material flowing in the exhaust pipe is lowered. Because the temperature of the high-temperature exhaust material is lowered, a portion of gas in the exhaust material is liquefied and becomes liquid water. Thus, a portion of gas flowing toward the gas-liquid separator becomes liquid water and is recovered. Therefore, liquid water recovery amounts may be increased compared to a structure in which the exhaust material simply remains in the gaseous state and flows to the gas-liquid separator.

In this fuel cell system, the gas whose temperature has been lowered by the pressure regulation unit lowers the temperature of the high-temperature exhaust material by use of the heat exchange unit. Thus, there is no need to provide an alternative device for lowering the temperature of the exhaust material. Therefore, an increase in energy consumption may be suppressed compared to a structure in which an alternative device is provided to lower the temperature of the exhaust material. That is, the fuel cell system according to the first aspect of the present disclosure may both suppress an increase in energy consumption and increase liquid water recovery amounts.

In a fuel cell system according to a second aspect of the present disclosure, a three-way valve is connected to the joining pipe, the three-way valve being capable of switching a flow path of at least the gas flowing through the joining pipe to one of the guide pipe or another pipe.

In the fuel cell system according to the second aspect of the present disclosure, when, for example, the fuel cell system is to be used in a hot-climate region in which large liquid water recovery amounts are required, the three-way valve is switched in advance to a side connecting with the guide pipe, and heat is exchanged at the heat exchange unit. Alternatively, when the fuel cell system is to be used in a cold-climate region in which large liquid water recovery amounts are not required, the three-way valve is switched in advance to a side connecting with the other pipe, and the exhaust material does not flow to the heat exchange unit. Thus, excessive cooling of the exhaust material by the heat exchange unit may be inhibited.

A fuel cell system according to a third aspect of the present disclosure further includes a temperature sensor that is provided at the joining pipe and measures a temperature of at least the gas, and a control unit that implements control to, when a measured temperature of at least the gas is higher than a maximum setting temperature, switch the three-way valve to a side connecting with the other pipe and, when the measured temperature is equal to or lower than the maximum setting temperature, switch the three-way valve to a side connecting with the guide pipe.

In the fuel cell system according to the third aspect of the present disclosure, when the measured temperature of the gas is not more than the maximum setting temperature, the three-way valve is switched to a side connecting with the guide pipe. As a result, the gas that has passed through the pressure regulation unit flows through the three-way valve into the guide pipe, and heat is exchanged at the heat exchange unit. Therefore, a portion of the gas flowing toward the gas-liquid separator becomes liquid water, and liquid water recovery amounts may be increased compared to a structure in which the exhaust material simply remains in the gaseous state and flows to the gas-liquid separator.

Alternatively, when the measured temperature of the gas is higher than the maximum setting temperature, the three-way valve is switched toa side connecting with the other pipe. As a result, the gas that has passed through the pressure regulation unit flows through the three-way valve into the another pipe and does not flow into the guide pipe. Thus, because gas with a measured temperature higher than the maximum setting temperature does not flow to the heat exchange unit, a raising of the temperature of the exhaust material exhausted from the fuel cell by the heat exchange unit may be inhibited.

In a fuel cell system according to a fourth aspect of the present disclosure, a minimum setting temperature that is lower than the maximum setting temperature is set at the control unit, and the control unit implements control to, when the measured temperature is equal to or higher than the minimum setting temperature and is equal to or lower than the maximum setting temperature, switch the three-way valve to a side connecting with the guide pipe and, when the measured temperature is lower than the minimum setting temperature, switch the three-way valve to a side connecting with the other pipe.

In the fuel cell system according to the fourth aspect of the present disclosure, when the measured temperature of the exhaust material is not less than the minimum setting temperature and not more than the maximum setting temperature, the three-way valve is switched to a side connecting with the guide pipe. As a result, the gas that has passed through the pressure regulation unit flows through the three-way valve into the guide pipe, and heat is exchanged at the heat exchange unit. Therefore, a portion of the gas flowing toward the gas-liquid separator becomes liquid water, and liquid water recovery amounts may be increased compared to a structure in which the exhaust material simply remains in the gaseous state and flows to the gas-liquid separator.

Alternatively, when the measured temperature of the gas is lower than the minimum setting temperature, the three-way valve is switched to a side connecting with the other pipe. As a result, the gas that has passed through the pressure regulation unit flows through the three-way valve into the another pipe and does not flow into the guide pipe. Thus, because gas with a measured temperature lower than the maximum setting temperature does not flow to the heat exchange unit, excessive cooling of the temperature of the exhaust material exhausted from the fuel cell by the heat exchange unit may be inhibited.

As described above, the present disclosure may both suppress an increase in energy consumption and increase liquid water recovery amounts.

BRIEF DESCRIPTION OF THE DRAWINGS

Exemplary embodiments of the present invention will be described in detail based on the following figures, wherein.

DETAILED DESCRIPTION

First Exemplary Embodiment

As an example of the present exemplary embodiment, a fuel cell system 20 is described.

Figure 1:
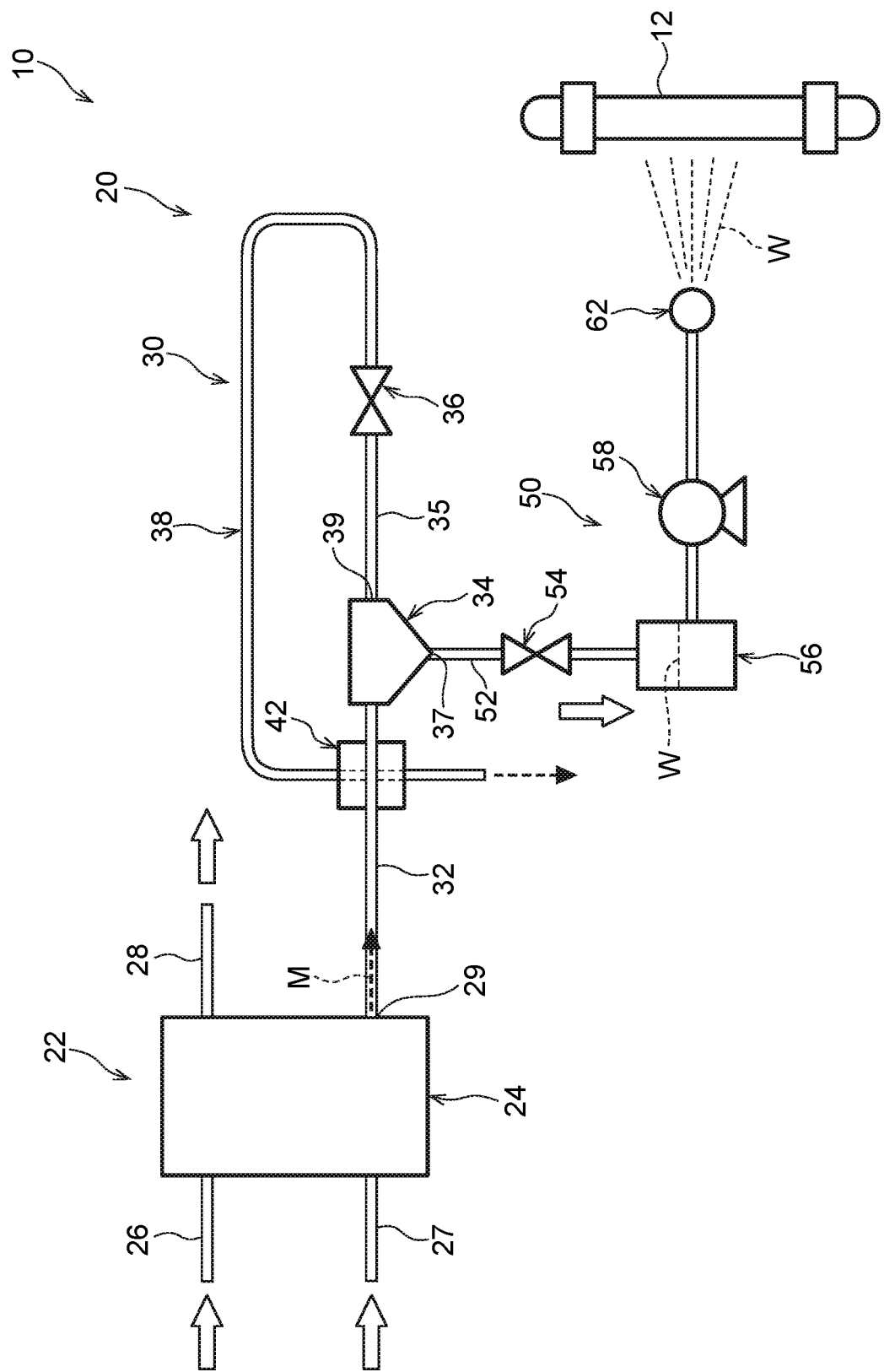
FIG. 1 is an overall schematic diagram of a fuel cell system according to a first exemplary embodiment.

The fuel cell system 20 shown in FIG. 1 is mounted at a vehicle 10 including a radiator 12. As an example, the fuel cell system 20 includes a cell main body section 22, an exhaust section 30 and a radiator cooling section 50.

—Cell Main Body Section—

As an example, the cell main body section 22 includes a fuel cell stack 24, a first supply pipe 26, a second supply pipe 27 and a hydrogen pipe 28.

The fuel cell stack 24 is an example of a fuel cell. More specifically, the fuel cell stack 24 is a unit that generates electricity by an electrochemical reaction between hydrogen and oxygen. The fuel cell stack 24 is formed by stacking plural cells, including electrolyte membranes that are not shown in the drawings, with electrodes and the like. Hydrogen is supplied to the fuel cell stack 24 from a hydrogen tank, which is not shown in the drawings, via the first supply pipe 26. Air (including oxygen and nitrogen) is supplied to the fuel cell stack 24 from an air supply device, which is not shown in the drawings, via the second supply pipe 27. Hydrogen that is not used in the electricity generation flows into the hydrogen pipe 28.

A connection port 29 is provided at a portion of the fuel cell stack 24. Exhaust material M is exhausted through the connection port 29. The exhaust material M contains gas (including oxygen, nitrogen, and water vapor) and liquid (liquid water W). The water vapor and liquid water are produced by the electrochemical reaction between hydrogen and oxygen. The liquid water W is water generated in excess of a saturated vapor amount of the exhaust material M.

—Exhaust Section—

As an example, the exhaust section 30 includes an exhaust pipe 32, a gas-liquid separator 34, a connecting pipe 35, a pressure regulating valve 36, a guide pipe 38 and a heat exchanger 42.

Exhaust Pipe

As an example, the exhaust pipe 32 is constituted by a tubular pipe that is long in one direction. The exhaust pipe 32 is fabricated of, for example, stainless steel. One end portion of the axial direction of the exhaust pipe 32 is connected to the connection port 29. The other end portion of the axial direction of the exhaust pipe 32 is connected to the gas-liquid separator 34, which is described below. The exhaust material M flows inside the exhaust pipe 32.

Gas-Liquid Separator

The gas-liquid separator 34 is connected to the exhaust pipe 32. The gas-liquid separator 34 separates the exhaust material M into gas and liquid (the liquid water W). A drainage port 37 and an exhaust port 39 are formed in the gas-liquid separator 34. The liquid water W drains through the drainage port 37. At least the gas is exhausted through the exhaust port 39. One end portion of an axial direction of a drainage pipe 52, which is described below, is connected to the drainage port 37. One end portion of an axial direction of the connecting pipe 35, which is described below, is connected to the exhaust port 39. Thus, of the gas and liquid water W separated in the gas-liquid separator 34, the liquid water W flows into the drainage pipe 52 and the gas flows into the connecting pipe 35. However, a portion of the liquid water W may flow into the connecting pipe 35.

Connecting Pipe

As an example, the connecting pipe 35 is constituted by a tubular pipe that is long in one direction. The connecting pipe 35 is fabricated of, for example, stainless steel. The other end portion of the axial direction of the connecting pipe 35 is connected to the pressure regulating valve 36, which is described below. The gas flows inside the connecting pipe 35. A portion of the liquid water W may also flow inside the connecting pipe 35. In other words, at least the gas flows inside the connecting pipe 35.

Pressure Regulating Valve

The pressure regulating valve 36 is an example of a pressure regulation unit. The pressure regulating valve 36 is connected to the downstream side of the connecting pipe 35. That is, the pressure regulating valve 36 is provided at the downstream side relative to the gas-liquid separator 34. The pressure regulating valve 36 is configured to regulate pressures of the gas such that a pressure of the gas at the upstream side (including the connecting pipe 35) relative to the pressure regulating valve 36 is higher than atmospheric pressure and is higher than a pressure of the gas in the guide pipe 38 (at the downstream side relative to the pressure regulating valve 36). In other words, the pressure regulating valve 36 is configured to regulate the pressures of the gas such that the pressure of the gas at the upstream side relative to the pressure regulating valve 36 is higher than atmospheric pressure, and such that the pressure of the gas at the downstream side relative to the pressure regulating valve 36 is lower than the pressure of the gas in the connecting pipe 35. Note that some of the liquid water may be present with the gas in the pressure regulating valve 36.

Because the pressures of the gas are regulated by the operation of the pressure regulating valve 36, internal pressures of the exhaust pipe 32, gas-liquid separator 34 and connecting pipe 35 between the fuel cell stack 24 and the pressure regulating valve 36 are higher than internal pressures at the downstream side relative to the pressure regulating valve 36. Because the internal pressure of the exhaust pipe 32 is raised in this manner, evaporation of water from the electrolyte membranes in the fuel cell stack 24, which are not shown in the drawings, is suppressed and a state in which the electrolyte membranes are moistened with water is maintained.

Guide Pipe

As an example, the guide pipe 38 is constituted by a tubular pipe that is inflected at plural locations. The guide pipe 38 is fabricated of, for example, stainless steel. One end portion of the guide pipe 38 is connected to the downstream side of the pressure regulating valve 36. The other end side of the guide pipe 38 extends to the exhaust pipe 32. That is, the guide pipe 38 is structured so as to guide at least the gas toward the exhaust pipe 32.

As an example, the other end side of the guide pipe 38 is disposed to be spaced apart in one direction so as not to be in contact with the exhaust pipe 32. Viewed in this one direction, the guide pipe 38 and the exhaust pipe 32 are, for example, arranged orthogonally. The other end of the guide pipe 38 is open such that the gas is exhausted to the exterior. That is, the other end of the guide pipe 38 is open to the atmosphere.

Heat Exchanger

The heat exchanger 42 is an example of a heat exchange unit. As an example, the heat exchanger 42 exchanges heat by a heat pipe system. The heat exchanger 42 is in contact with the exhaust pipe 32 and the guide pipe 38, and heat is exchanged between the exhaust pipe 32 and the guide pipe 38 via the heat exchanger 42. More specifically, heat is exchanged between the exhaust material M in a high-temperature state that is flowing in the exhaust pipe 32 and the gas in a low-temperature state that is flowing in the guide pipe 38.

—Radiator Cooling Section—

As an example, the radiator cooling section 50 includes the drainage pipe 52, an opening modulating valve 54, a tank 56, a pump 58 and a jetting unit 62.

The drainage pipe 52 is constituted as piping in which plural cylindrical tubular pipes are linked together, which connects between the opening modulating valve 54, the tank 56, the pump 58 and the jetting unit 62. The one end portion of the drainage pipe 52 is connected to the drainage port 37. Another end portion of the drainage pipe 52 extends toward the radiator 12. The opening modulating valve 54 is provided at the side of the drainage pipe 52 that is closer to the gas-liquid separator 34. A degree of opening of the flow path may be modulated by operation of the opening modulating valve 54.

The tank 56 is disposed at the downstream side of the drainage pipe 52 relative to the opening modulating valve 54. Liquid water W flowing out from the gas-liquid separator 34 through the drainage pipe 52 is stored in the tank 56. The pump 58 is disposed at the downstream side of the drainage pipe 52 relative to the tank 56. The pump 58 functions to feed the liquid water W in the drainage pipe 52 (including the liquid water W in the tank 56) to the downstream side. The jetting unit 62 is constituted as a member in which numerous jetting-out holes, which are not shown in the drawings, are formed. The jetting unit 62 is fixed to the another end portion of the drainage pipe 52. The liquid water W that is fed by the pump 58 is jetted out toward the radiator 12 through the jetting-out holes of the jetting unit 62. The radiator 12 is lowered in temperature by the liquid water W being sprayed thereon.

—Operation and Effects—

Now, operation and effects of the fuel cell system 20 according to the first exemplary embodiment are described.

In the fuel cell system 20, the exhaust material M exhausted from the fuel cell stack 24 is separated into gas and liquid at the gas-liquid separator 34. The liquid is recovered as liquid water W and is used in the radiator cooling section 50 for cooling of the radiator 12. Meanwhile, a portion of the liquid (liquid water) that could not be recovered at the gas-liquid separator 34 flows with the gas through the gas-liquid separator 34 to the pressure regulating valve 36 at the downstream side. At the pressure regulating valve 36, the pressures of the gas are regulated such that the pressure of the gas at the upstream side (including the connecting pipe 35) relative to the pressure regulating valve 36 is higher than atmospheric pressure and such that the pressure of the gas at the downstream side relative to the pressure regulating valve 36 is lower than the pressure of the gas in the connecting pipe 35 at the upstream side. Some of the liquid water may be present in addition to the gas.

Figure 2:
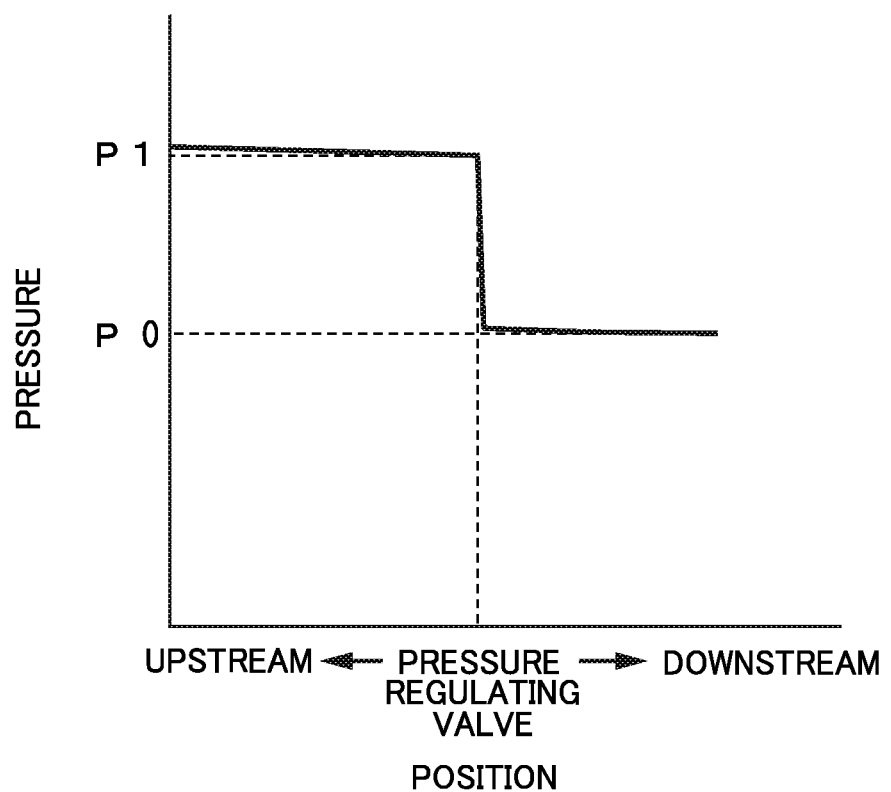
FIG. 2 is a graph showing pressures of exhaust material at an upstream side and downstream side of a pressure regulation unit of the fuel cell system shown in FIG. 1.

As shown in FIG. 2, the upstream side relative to the pressure regulating valve 36 is in a high-pressure state substantially at a pressure P1. Because the guide pipe 38 at the downstream side relative to the pressure regulating valve 36 (see FIG. 1) is open to the atmosphere, the pressure of the gas at the downstream side is lowered substantially to atmospheric pressure P0 (<P1).

Because the pressure of the gas that has passed through the pressure regulating valve 36 is lowered to atmospheric pressure in the guide pipe 38 shown in FIG. 1, the temperature of the gas falls in accordance with the Joule-Thomson effect. The gas whose temperature has been lowered is guided by the guide pipe 38 toward the exhaust pipe 32. When some of the liquid water W is mixed in with the gas that has passed through the gas-liquid separator 34, pressure on the liquid water W is reduced by passing through the pressure regulating valve 36 and the liquid water W liquefies. Therefore, an amount of heat corresponding to the latent heat of vaporization is absorbed, and the temperature of the gas is lowered further.

At the heat exchanger 42, heat is exchanged between the exhaust pipe 32 and the guide pipe 38. More specifically, heat is exchanged between the high-temperature exhaust material M flowing in the exhaust pipe 32 and the low-temperature gas flowing through the guide pipe 38. Thus, the temperature of the high-temperature exhaust material M flowing in the exhaust pipe 32 is lowered. Because the temperature of the high-temperature exhaust material M is lowered, a portion of the gas in the exhaust material M (water vapor) liquefies and becomes liquid water W. Thus, a portion of the gas flowing toward the gas-liquid separator 34 does not continue to flow as gas and can be recovered as liquid water W. Therefore, recovery amounts of the liquid water W may be increased compared to a structure in which the exhaust material M simply remains as gas and flows to the gas-liquid separator 34.

In the fuel cell system 20, because the gas whose temperature has been lowered by the pressure regulating valve 36 is used with the heat exchanger 42 to lower the temperature of the high-temperature exhaust material M, there is no need to provide an alternative device for lowering the temperature of the exhaust material M. Therefore, an increase in energy consumption may be suppressed compared to a structure in which an alternative device is provided to lower the temperature of the exhaust material M. That is, the fuel cell system 20 may both suppress an increase in energy consumption and increase recovery amounts of liquid water W.

Second Exemplary Embodiment

Now, a fuel cell system 70 according to a second exemplary embodiment is described. Structures that are similar to the fuel cell system 20 according to the first exemplary embodiment (see FIG. 1) are assigned the same reference symbols as in the first exemplary embodiment and, as appropriate, are not described.

Figure 3:
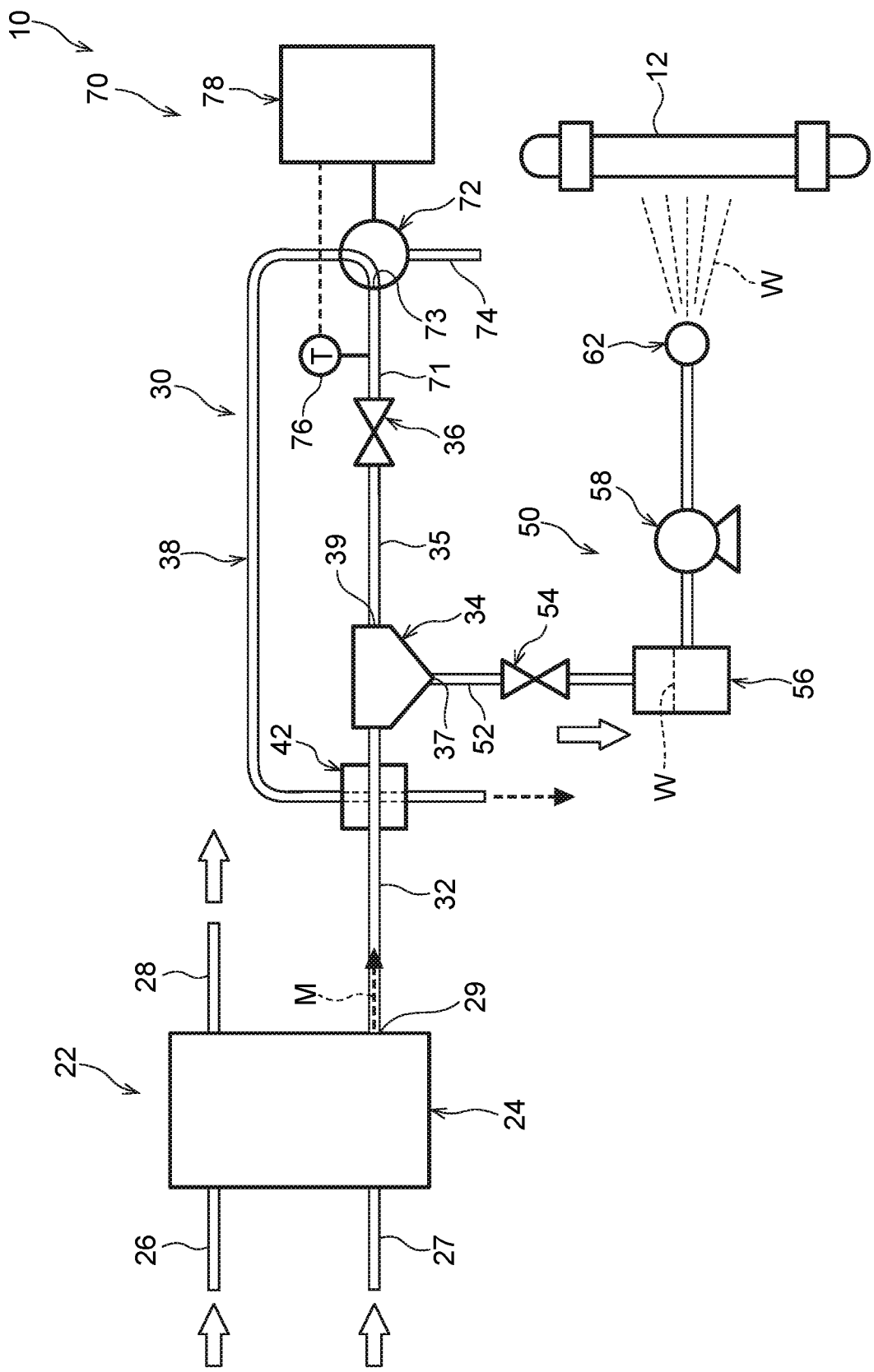
FIG. 3 is an overall schematic diagram of a fuel cell system according to a second exemplary embodiment.

The fuel cell system 70 shown in FIG. 3 further includes, in the exhaust section 30 of the fuel cell system 20 (see FIG. 1), a joining pipe 71, a three-way valve 72, an exhaust pipe 74, a temperature sensor 76 and a control unit 78. Structures other than the joining pipe 71, the three-way valve 72, the exhaust pipe 74, the temperature sensor 76 and the control unit 78 are the same as in the fuel cell system 20.

Joining Pipe

As an example, the joining pipe 71 is constituted by a tubular pipe that is long in one direction. The joining pipe 71 is fabricated of, for example, stainless steel. One end portion of the axial direction of the joining pipe 71 is connected to the pressure regulating valve 36. The three-way valve 72, which is described below, is connected to the other end portion of the axial direction of the joining pipe 71. At least the gas flows inside the joining pipe 71. The other end portion of the axial direction of the joining pipe 71 is referred to as a connection portion 73.

Three-Way Valve

Figure 4:
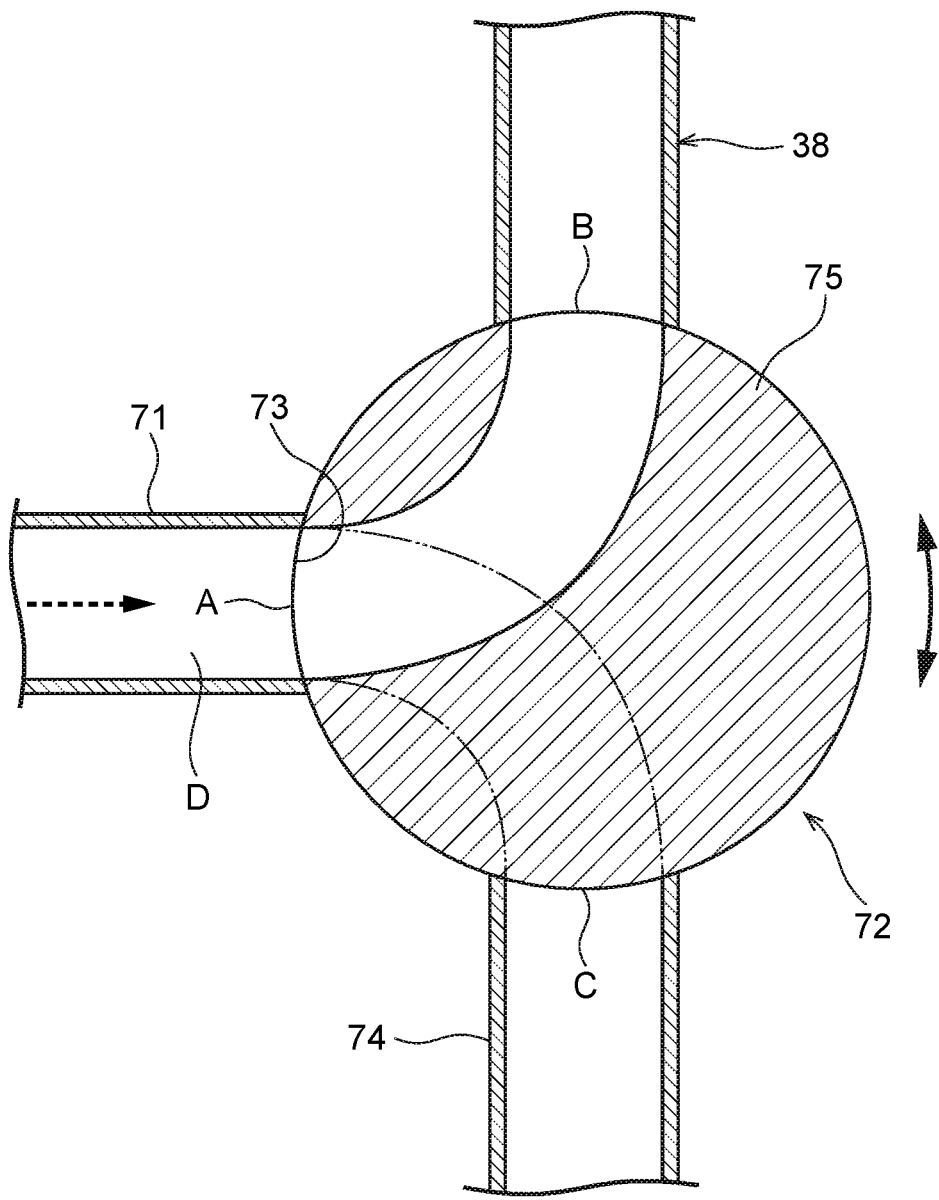
FIG. 4 is a schematic diagram of a valve of the fuel cell system shown in FIG. 3.

The three-way valve 72 shown in FIG. 4 features a single inflow port (port A) and two outflow ports (ports B and C). The three-way valve 72 includes a valve body 75 that is relatively rotatable with respect to a main body portion, which is not shown in the drawing. The three-way valve 72 is capable, by operation (rotation) of the valve body 75, of switching between connecting port A with port B (blocking port C) and connecting port A with port C (blocking Port B). Port A is connected to the connection portion 73 of the joining pipe 71. One side end portion (the upstream side end portion) of the guide pipe 38 is connected to port B. That is, the guide pipe 38 is connected with the pressure regulating valve 36 via the joining pipe 71. One side end portion (an upstream side end portion) of the exhaust pipe 74, which is described below, is connected to port C.

A motor and a position sensor are provided at the three-way valve 72. The motor, which is not shown in the drawings, drives rotations of the valve body 75. The position sensor, which is not shown in the drawings, senses positions of the valve body 75. Position information of the valve body 75 that is sensed by the position sensor is sent to the control unit 78 (see FIG. 3), which is described below. Hence, switching of the three-way valve 72 may be controlled by the control unit 78.

That is, the three-way valve 72 is capable of switching a flow path D of at least the gas flowing through the joining pipe 71 to one or other of the guide pipe 38 and the exhaust pipe 74. In other words, the three-way valve 72 selectively connects the joining pipe 71 with one of the guide pipe 38 and the exhaust pipe 74. The position of the valve body 75 in the state in which port A is connected with port B is referred to as a first position of the three-way valve 72. The position of the valve body 75 in the state in which port A is connected with port C is referred to as a second position of the three-way valve 72.

Exhaust Pipe

The exhaust pipe 74 shown in FIG. 3 is an example of another pipe. As an example, the exhaust pipe 74 is constituted by a tubular pipe that is long in one direction. The exhaust pipe 74 is fabricated of, for example, stainless steel. As described above, the one end portion of the axial direction of the exhaust pipe 74 is connected to port C of the three-way valve 72 (see FIG. 4). The other end portion of the axial direction of the exhaust pipe 74 is open to the atmosphere.

Temperature Sensor

The temperature sensor 76 is provided at the joining pipe 71 (between the pressure regulating valve 36 and the three-way valve 72). The temperature sensor 76 measures temperatures of at least the gas that is present in the joining pipe 71. Information on measured temperatures measured by the temperature sensor 76 is sent to the control unit 78, which is described below.

Control Unit

The control unit 78 is equipped with an electronic control unit (ECU), which is not shown in the drawings. The ECU is constituted by a microcomputer including a central processing unit (CPU), a read-only memory (ROM), a random access memory (RAM) and so forth. Programs that control operations of respective parts of the vehicle 10 and the fuel cell system 70 are specified at the control unit 78.

Figure 5:
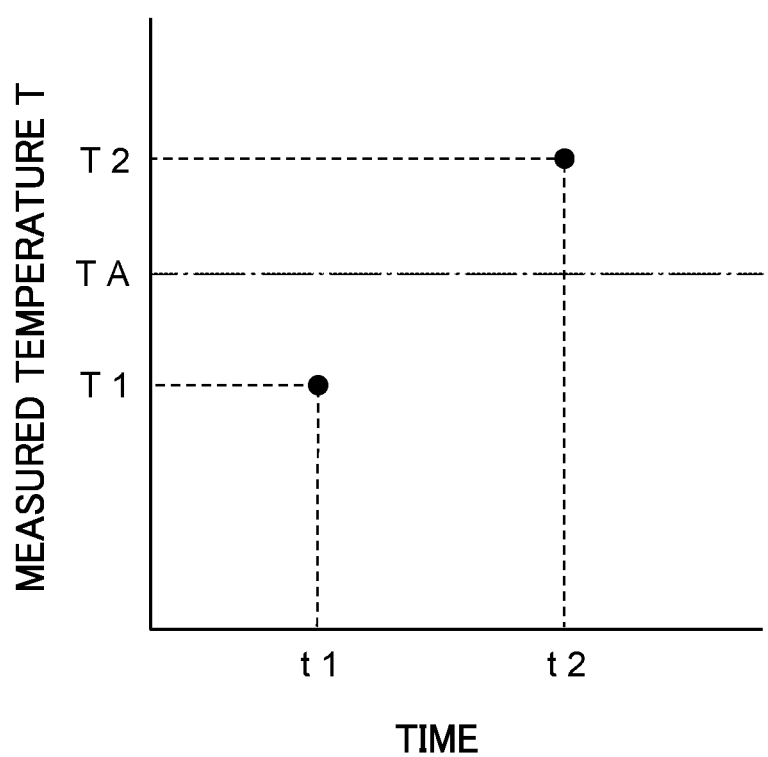
FIG. 5 is a graph showing temperatures of exhaust material and a setting temperature in the fuel cell system shown in FIG. 3.

FIG. 5 depicts, as an example, measured temperatures T1 and T2 (unit: ° C.) and a maximum setting temperature TA. The maximum setting temperature TA is set at the control unit 78 beforehand (see FIG. 3), and is used for determination of switching of the three-way valve 72 (see FIG. 3). The measured temperature T1 (<TA) is, for example, a temperature measured by the temperature sensor 76 (see FIG. 3) at a time t1. The measured temperature T2 (>TA) is, for example, a temperature measured by the temperature sensor 76 at a time t2 (>t1).

A program at the control unit 78 is specified so as to perform control to switch the three-way valve 72 to the side that connects with the exhaust pipe 74 when a measured temperature T of at least the gas measured by the temperature sensor 76 is higher than the maximum setting temperature TA (see FIG. 5). The program at the control unit 78 is also specified so as to perform control to switch the three-way valve 72 to the side that connects with the guide pipe 38 when a measured temperature T is lower than or equal to the maximum setting temperature TA.

—Operation and Effects—

Figure 6:
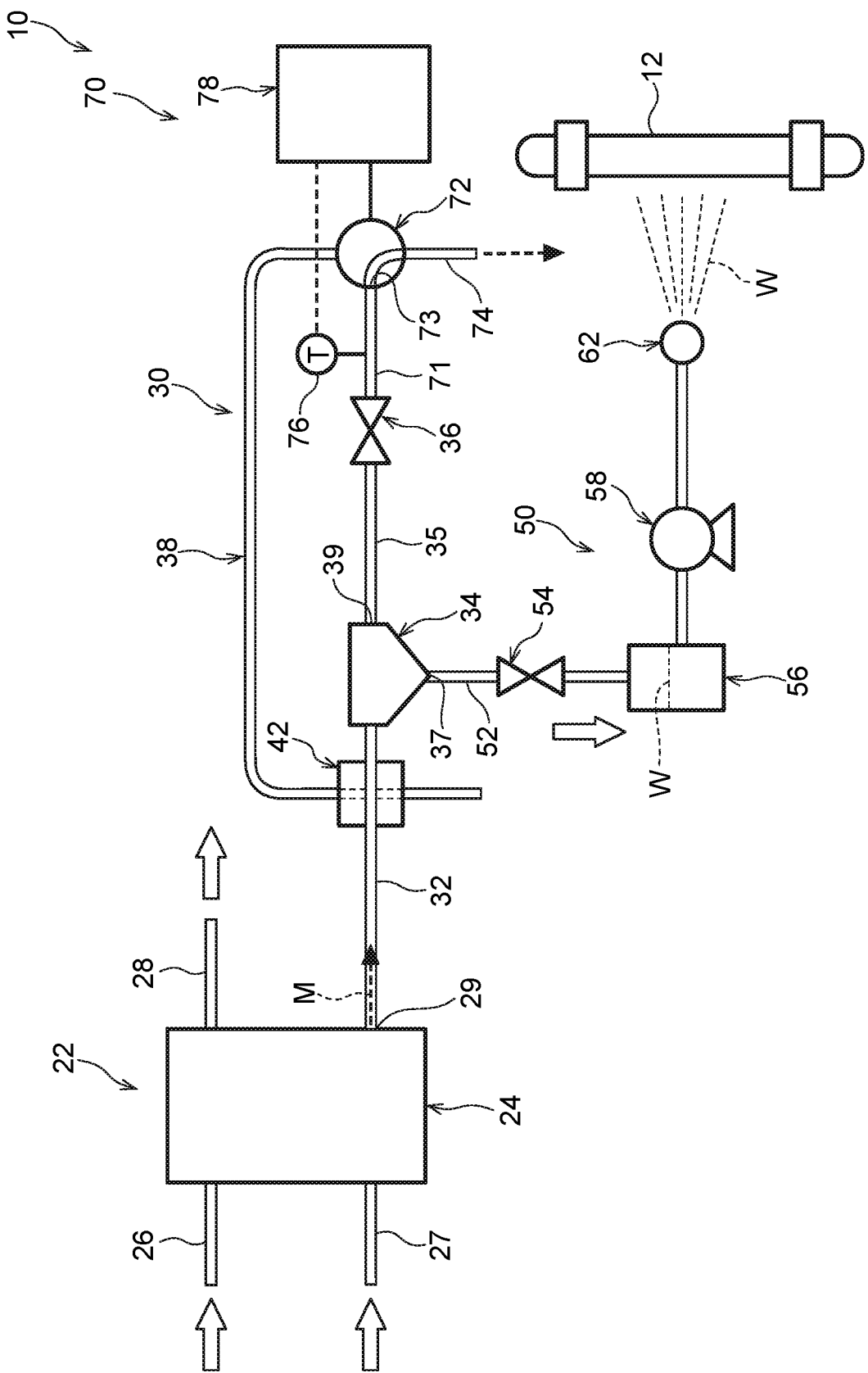
FIG. 6 is a schematic diagram showing a state in which the valve of the fuel cell system shown in FIG. 3 is switched to a second exhaust pipe side.
Figure 7:
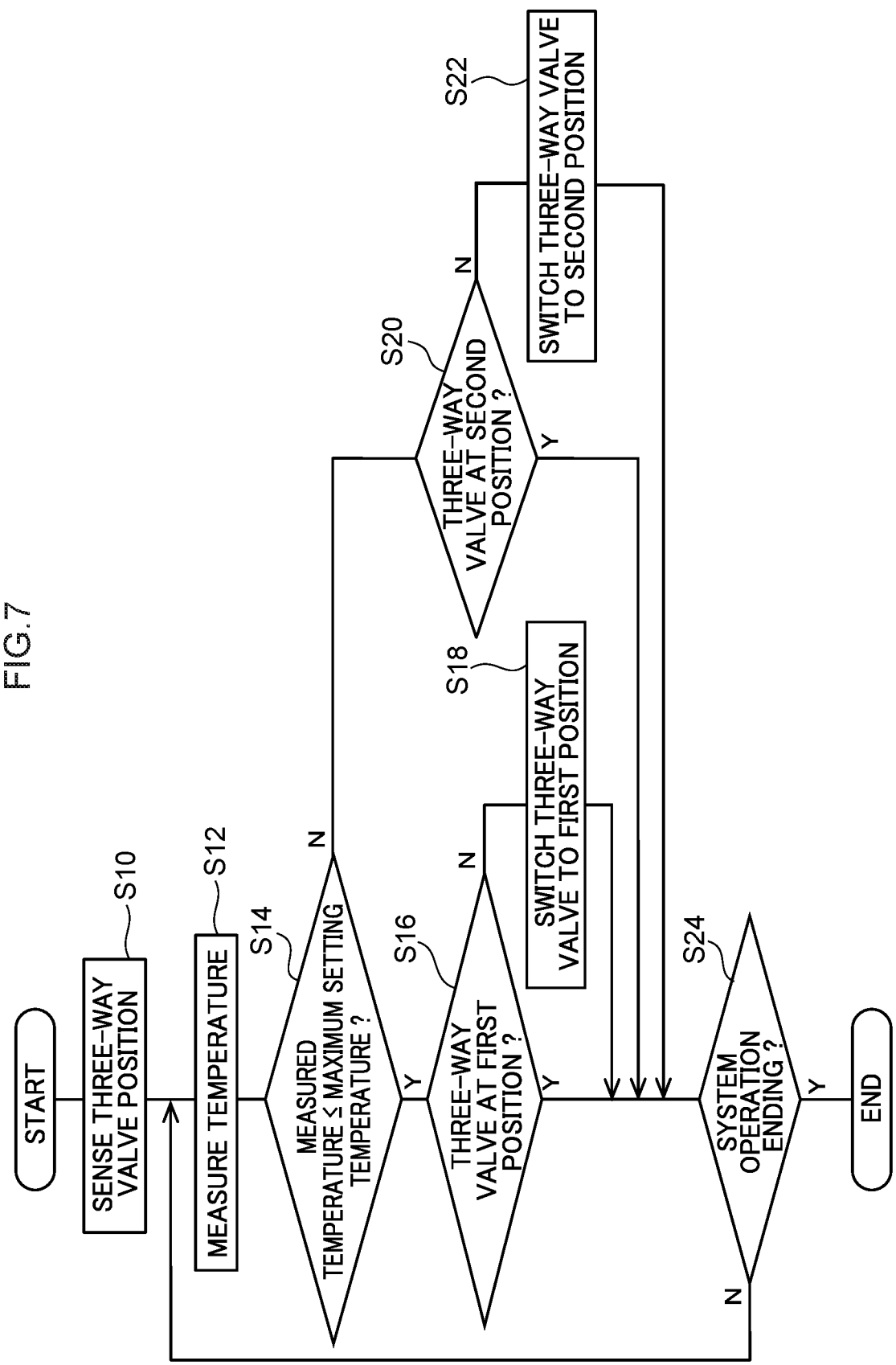
FIG. 7 is a flowchart showing a flow of processing for switching the valve position on the basis of detected temperatures in the fuel cell system shown in FIG. 3.

Now, operation and effects of the fuel cell system 70 according to the second exemplary embodiment are described using the flowchart shown in FIG. 7. See FIG. 3 to FIG. 6 for respective portions of the fuel cell system 70. It is assumed that the fuel cell system 70 has already been started up.

In step S10, it is sensed whether the position of the three-way valve 72 is at the first position or the second position. Position information of the three-way valve 72 is temporarily memorized at the control unit 78. Then the control unit 78 proceeds to step S12.

In step S12, a measured temperature T is measured by the temperature sensor 76. Information of the measured temperature T is sent to the control unit 78. Then the control unit 78 proceeds to step S14.

In step S14, the control unit 78 makes a determination as to whether or not the measured temperature T is equal to or lower than the maximum setting temperature TA. If the temperature T is equal to or lower than the maximum setting temperature TA, the control unit 78 proceeds to step S16. If the measured temperature T is higher than the maximum setting temperature TA, the control unit 78 proceeds to step S20.

In step S16, the control unit 78 makes a determination as to whether or not the position of the three-way valve 72 is at the first position. If the position of the three-way valve 72 is at the first position, the control unit 78 proceeds to step S24. If the position of the three-way valve 72 is at the second position, the control unit 78 proceeds to step S18.

In step S18, the position of the three-way valve 72 is switched from the second position to the first position (see FIG. 3) by the control unit 78 operating the valve body 75. Then the control unit 78 proceeds to step S24.

In step S20, the control unit 78 makes a determination as to whether or not the position of the three-way valve 72 is at the second position. If the position of the three-way valve 72 is at the second position, the control unit 78 proceeds to step S24. If the position of the three-way valve 72 is at the first position, the control unit 78 proceeds to step S22.

In step S22, the position of the three-way valve 72 is switched from the first position to the second position (see FIG. 6) by the control unit 78 operating the valve body 75. Then the control unit 78 proceeds to step S24.

In step S24, the control unit 78 makes a determination as to whether operation of the fuel cell system 70 is ending. If operation of the fuel cell system 70 is continuing, the control unit 78 proceeds to step S12. If operation of the fuel cell system 70 is ending, the program ends.

In the fuel cell system 70 shown in FIG. 3, similarly to the fuel cell system 20 (see FIG. 1), the pressures of the gas are regulated at the pressure regulating valve 36 such that the pressure of the gas at the downstream side is lower than the pressure of the gas at the upstream side. The temperature of the exhaust material M in the guide pipe 38 is lowered in accordance with the Joule-Thompson effect. At the heat exchanger 42, the temperature of the exhaust material in the exhaust pipe 32 at the upstream side relative to the gas-liquid separator 34 is lowered by heat being exchanged between the high-temperature exhaust material M in the exhaust pipe 32 and the low-temperature gas flowing through the guide pipe 38. Because the temperature of the high-temperature exhaust material M is lowered, a portion of the gas in the exhaust material M (water vapor) liquefies and becomes liquid water W. Thus, a portion of the gas flowing toward the gas-liquid separator 34 does not continue to flow as gas and can be recovered as liquid water W. Therefore, an increase in energy consumption may be suppressed and recovery amounts of the liquid water W may be increased.

In the fuel cell system 70, as described above, the three-way valve 72 is switched to a side connecting with the guide pipe 38 when a measured temperature T of the gas is equal to or lower than the maximum setting temperature TA. As a result, the exhaust material M that has passed through the pressure regulating valve 36 flows through the three-way valve 72 into the guide pipe 38 and heat is exchanged thereto at the heat exchanger 42. Therefore, a portion of the gas flowing toward the gas-liquid separator 34 falls in temperature and becomes liquid water W, and recovery amounts of the liquid water W may be increased compared to a structure in which the exhaust material M simply remains as gas and flows to the gas-liquid separator 34.

On the other hand, as illustrated in FIG. 6, when the measured temperature T of the gas is higher than the maximum setting temperature TA, the three-way valve 72 is switched to a side connecting with the exhaust pipe 74. As a result, the gas that has passed through the pressure regulating valve 36 flows through the three-way valve 72 to the exhaust pipe 74 and does not flow in the guide pipe 38. That is, gas with measured temperatures T higher than the maximum setting temperature TA does not flow to the heat exchanger 42, and raising of the temperature of the exhaust material M exhausted from the fuel cell stack 24 by the heat exchanger 42 may be inhibited.

Third Exemplary Embodiment

Now, the fuel cell system 70 according to a third exemplary embodiment (see FIG. 3) is described. The fuel cell system 70 according to the third exemplary embodiment is similar in configuration to the fuel cell system 70 according to the second exemplary embodiment, except that control of the three-way valve 72 by the control unit 78 is partially different. Therefore, the same reference symbols as in the second exemplary embodiment are assigned and descriptions are omitted as appropriate.

Figure 8:
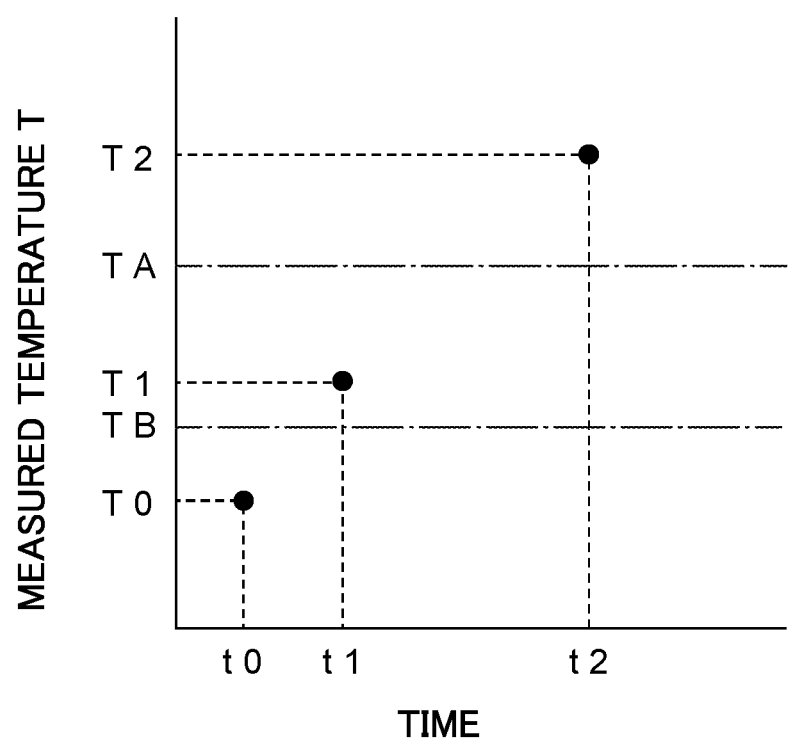
FIG. 8 is a graph showing temperatures of exhaust material, a maximum setting temperature and a minimum setting temperature in a fuel cell system according to a third exemplary embodiment.

FIG. 8 depicts, as an example, measured temperatures T0, T1 and T2 (unit: ° C.), the maximum setting temperature TA, and a minimum setting temperature TB. The minimum setting temperature TB is set at the control unit 78 beforehand and, together with the maximum setting temperature TA, is used for determination of switching of the three-way valve 72 (see FIG. 3). The minimum setting temperature TB is lower than the maximum setting temperature TA. The measured temperature T0 (<T1) is, for example, a temperature measured by the temperature sensor 76 (see FIG. 3) at a time t0 (<t1).

In the fuel cell system 70 according to the third exemplary embodiment (see FIG. 3), the program at the control unit 78 is specified so as to perform control to switch the three-way valve 72 to the side that connects with the exhaust pipe 74 when a measured temperature T of the gas is higher than the maximum setting temperature TA or is lower than the minimum setting temperature TB. The program at the control unit 78 is specified so as to perform control to switch the three-way valve 72 to the side that connects with the guide pipe 38 when a measured temperature T is equal to or higher than the minimum setting temperature TB and is equal to or lower than the maximum setting temperature TA.

—Operation and Effects—

Figure 9:
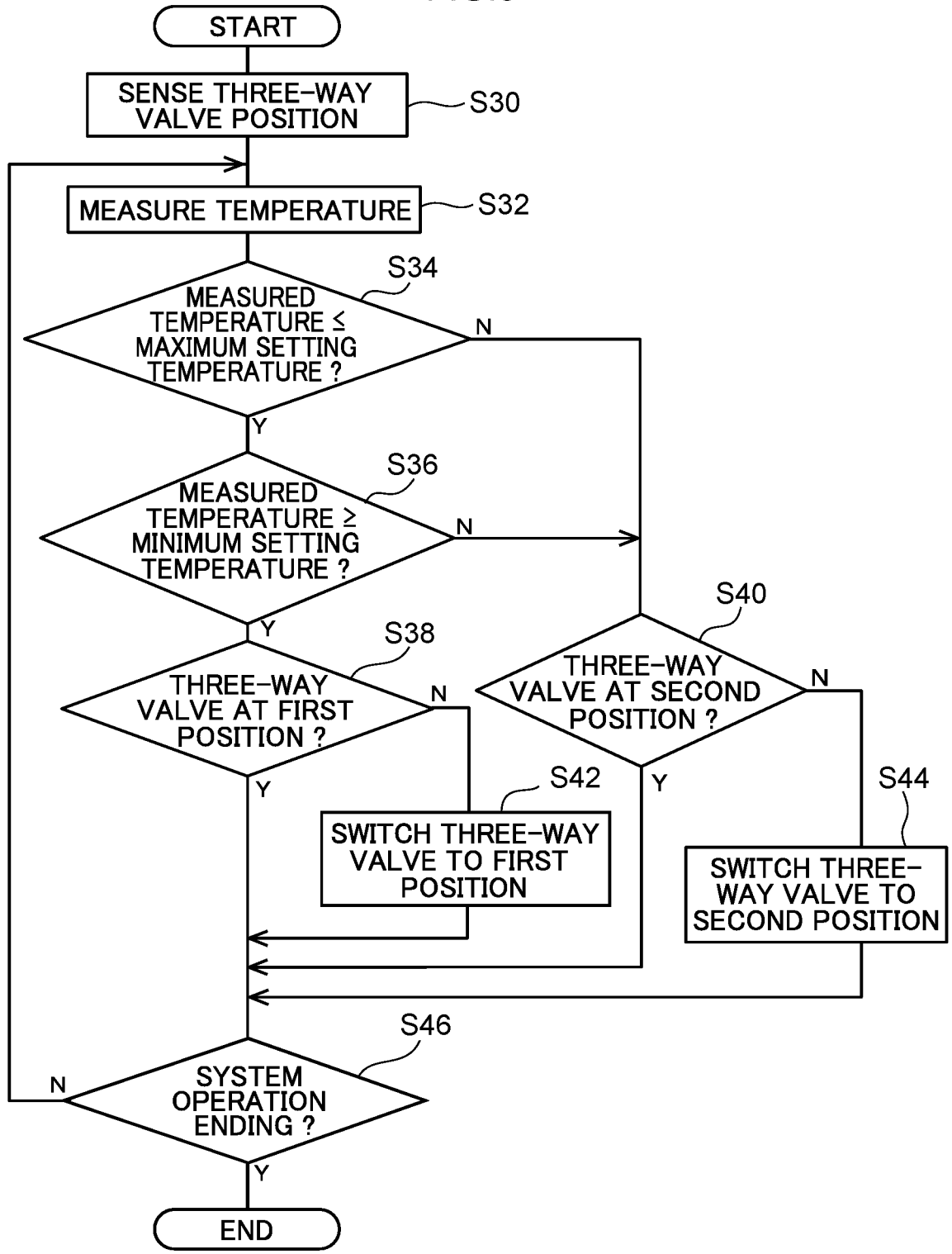
FIG. 9 is a flowchart showing a flow of processing for switching a valve position on the basis of detected temperatures in the fuel cell system according to the third exemplary embodiment.

Now, operation and effects of the fuel cell system 70 according to the third exemplary embodiment are described using the flowchart shown in FIG. 9. See FIG. 3, FIG. 6 and FIG. 8 for respective portions of the fuel cell system 70. It is assumed that the fuel cell system 70 has already been started up.

In step S30, it is sensed whether the position of the three-way valve 72 is at the first position or the second position. Position information of the three-way valve 72 is temporarily memorized at the control unit 78. Then the control unit 78 proceeds to step S32.

In step S32, a measured temperature T is measured by the temperature sensor 76. Information of the measured temperature T is sent to the control unit 78. Then the control unit 78 proceeds to step S34.

In step S34, the control unit 78 makes a determination as to whether or not the measured temperature T is equal to or lower than the maximum setting temperature TA. If the temperature T is equal to or lower than the maximum setting temperature TA, the control unit 78 proceeds to step S36. If the measured temperature T is higher than the maximum setting temperature TA, the control unit 78 proceeds to step S40.

In step S36, the control unit 78 makes a determination as to whether or not the measured temperature T is equal to or higher than the minimum setting temperature TB. If the temperature T is equal to or higher than the minimum setting temperature TB, the control unit 78 proceeds to step S38. If the measured temperature T is lower than the minimum setting temperature TB, the control unit 78 proceeds to step S40.

In step S38, the control unit 78 makes a determination as to whether or not the position of the three-way valve 72 is at the first position. If the position of the three-way valve 72 is at the first position, the control unit 78 proceeds to step S46. If the position of the three-way valve 72 is at the second position, the control unit 78 proceeds to step S42.

In step S40, the control unit 78 makes a determination as to whether or not the position of the three-way valve 72 is at the second position. If the position of the three-way valve 72 is at the second position, the control unit 78 proceeds to step S46. If the position of the three-way valve 72 is at the first position, the control unit 78 proceeds to step S44.

In step S42, the position of the three-way valve 72 is switched from the second position to the first position by the control unit 78 operating the valve body 75. Then the control unit 78 proceeds to step S46.

In step S44, the position of the three-way valve 72 is switched from the first position to the second position by the control unit 78 operating the valve body 75. Then the control unit 78 proceeds to step S46.

In step S46, the control unit 78 makes a determination as to whether operation of the fuel cell system 70 is ending. If operation of the fuel cell system 70 is continuing, the control unit 78 proceeds to step S32. If operation of the fuel cell system 70 is ending, the program ends.

In the fuel cell system 70 according to the third exemplary embodiment, similarly to the fuel cell system 70 according to the second exemplary embodiment, an increase in energy consumption may be suppressed and recovery amounts of the liquid water W may be increased.

In the fuel cell system 70 according to the third exemplary embodiment, the three-way valve 72 is switched to a side connecting with the guide pipe 38 when a measured temperature T of the gas is equal to or higher than the minimum setting temperature TB and is equal to or lower than the maximum setting temperature TA. As a result, at least the gas that has passed through the pressure regulating valve 36 flows through the three-way valve 72 into the guide pipe 38 and heat is exchanged thereto at the heat exchanger 42. Thus, a portion of the gas flowing toward the gas-liquid separator 34 does not continue to flow as gas but falls in temperature and becomes liquid water W. Therefore, recovery amounts of the liquid water W may be increased compared to a structure in which the exhaust material M simply remains as gas and flows to the gas-liquid separator 34.

The three-way valve 72 is switched to a side connecting with the exhaust pipe 74 when a measured temperature T of the exhaust material M is higher than the maximum setting temperature TA. As a result, at least the gas that has passed through the pressure regulating valve 36 flows through the three-way valve 72 to the exhaust pipe 74 and does not flow in the guide pipe 38. That is, gas with measured temperatures T higher than the maximum setting temperature TA does not flow to the heat exchanger 42, and cases of the temperature of the exhaust material M exhausted from the fuel cell stack 24 being raised by the heat exchanger 42 may be inhibited.

The three-way valve 72 is also switched to a side connecting with the exhaust pipe 74 when a measured temperature T of the gas is lower than the minimum setting temperature TB. As a result, at least the gas that has passed through the pressure regulating valve 36 flows through the three-way valve 72 to the exhaust pipe 74 and does not flow in the guide pipe 38. That is, gas with measured temperatures T lower than the minimum setting temperature TB does not flow to the heat exchanger 42, and cases of the temperature of the exhaust material M exhausted from the fuel cell stack 24 being excessively cooled by the heat exchanger 42 may be inhibited.

Fourth Exemplary Embodiment

Now, a fuel cell system 80 according to a fourth exemplary embodiment is described. Structures that are similar to the fuel cell system 20 according to the first exemplary embodiment (see FIG. 1) or the fuel cell system 70 according to the second exemplary embodiment (see FIG. 3) are assigned the same reference symbols as in the first and second exemplary embodiments and are not described, as appropriate.

Figure 10:
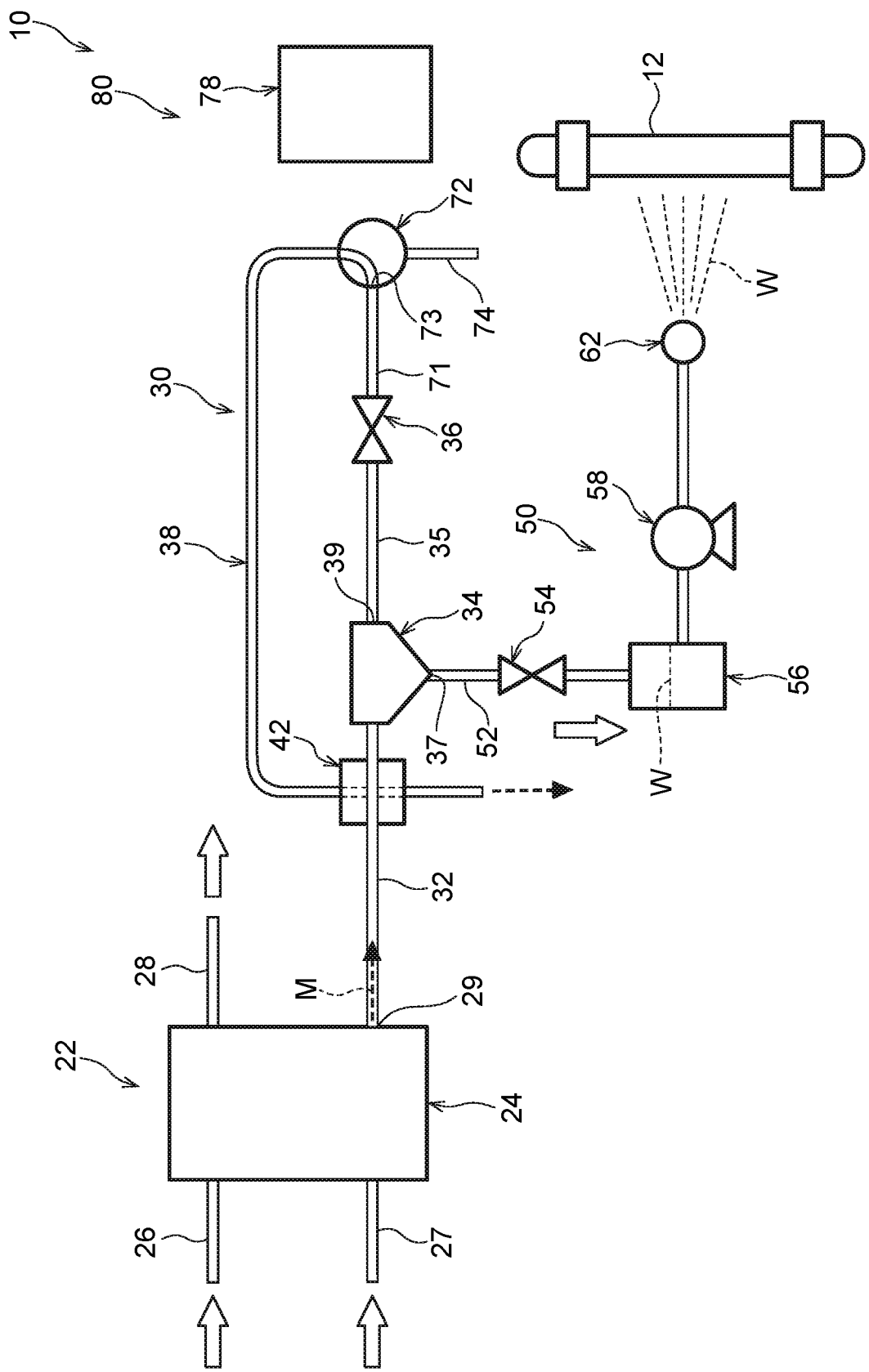
FIG. 10 is an overall schematic diagram of a fuel cell system according to a fourth exemplary embodiment.

The fuel cell system 80 shown in FIG. 10 has a structure in which the temperature sensor 76 (see FIG. 3) is removed from the fuel cell system 70 (see FIG. 3), and the control unit 78 does not conduct switching of the three-way valve 72. That is, the three-way valve 72 is switched manually in the fuel cell system 80.

—Operation and Effects—

Now, operation and effects of the fuel cell system 80 according to the fourth exemplary embodiment are described.

When the fuel cell system 80 is to be used in, for example, a hot-climate region in which large liquid water recovery amounts (recovery amounts of the liquid water W) are required, the three-way valve 72 of the fuel cell system 80 is manually switched to a side connecting with the guide pipe 38 in advance, and heat is exchanged at the heat exchanger 42.

Alternatively, when the fuel cell system 80 is to be used in a cold-climate region in which large liquid water recovery amounts are not required, the three-way valve 72 is switched to a side connecting with the exhaust pipe 74 in advance and the exhaust material M does not flow to the heat exchanger 42. As a result, excessive cooling of the exhaust material M by the heat exchanger 42 may be inhibited.

The present disclosure is not limited by the exemplary embodiments described above.

In the fuel cell systems 20, 70 and 80, the radiator cooling section 50 need not be provided; the liquid water flowing from the gas-liquid separator 34 may be directly stored in the tank 56. Furthermore, piping may be provided from the tank 56 to the fuel cell stack 24 and, when an amount of the liquid water W stored in the tank 56 is large, the liquid water W may flow in this piping and cool the fuel cell stack 24.

The guide pipe 38 is not limited to being constituted by a single pipe but may branch into a plural number of pipes partway therealong. The joining pipe 71 may be included in the guide pipe 38. That is, the three-way valve 72 may be provided partway along the guide pipe 38.

In the fuel cell system 20: a sensor that senses a water surface level of the liquid water W in the tank 56 may be provided; the heat exchanger 42 may be provided to be contactable with and separable from the exhaust pipe 32 and the guide pipe 38; and the heat exchanger 42 may be moved in accordance with the water surface level of the liquid water W. For example, when the water surface level is high (the amount of liquid water is large), recovery amounts of the liquid water W may be reduced by separating the heat exchanger 42 from the exhaust pipe 32 and the guide pipe 38. On the other hand, when the water surface level is low (the amount of liquid water is small), recovery amounts of the liquid water W may be increased by putting the heat exchanger 42 into contact with the exhaust pipe 32 and the guide pipe 38.

The vehicle 10 does not necessarily run with constant electricity consumption amounts (loads). For example, electricity consumption may be higher on hilly roads than on flat roads. When electricity consumption amounts increase, temperatures of the exhaust material M may be higher. Accordingly, running states of the vehicle 10 may be associated in advance with temperatures of the exhaust material M exhausted from the fuel cell stack 24, and switching of the three-way valve 72 may be controlled in accordance with running states of the vehicle 10.

The heat exchange unit is not limited to the heat exchanger 42 and may be structured as, for example, a contact portion in which an outer periphery surface of the exhaust pipe 32 is in direct contact with an outer periphery surface of the guide pipe 38.

What is claimed is:

1. A fuel cell system comprising:
   an exhaust pipe through which exhaust material exhausted from a fuel cell flows;
   a gas-liquid separator connected to the exhaust pipe, the gas-liquid separator separating the exhaust material into gas and liquid;
   a connecting pipe connected to an exhaust port of the gas-liquid separator, at least the gas being exhausted through the exhaust port;
   a pressure regulation unit connected to the connecting pipe, the pressure regulation unit regulating pressures of the gas such that a pressure of the gas at an upstream side of the pressure regulation unit is higher than atmospheric pressure;
   a guide pipe that is connected to the downstream side of the pressure regulation unit or that is connected to the pressure regulation unit via a joining pipe, the guide pipe guiding at least the gas toward the exhaust pipe; and
   a heat exchange unit that exchanges heat between the exhaust pipe and the guide pipe.

2. The fuel cell system according to claim 1, wherein a three-way valve is connected to the joining pipe, the three-way valve being capable of switching a flow path of at least the gas flowing through the joining pipe to one of the guide pipe or another pipe.

3. The fuel cell system according to claim 2, further comprising:
   a temperature sensor that is provided at the joining pipe and measures a temperature of at least the gas; and
   a control unit that implements control to:
      when a measured temperature of at least the gas is higher than a maximum setting temperature, switch the three-way valve to a side connecting with the other pipe and,
      when the measured temperature is equal to or lower than the maximum setting temperature, switch the three-way valve to a side connecting with the guide pipe.

4. The fuel cell system according to claim 3, wherein:
a minimum setting temperature that is lower than the maximum setting temperature is set at the control unit, and
the control unit implements control to:
when the measured temperature is equal to or higher than the minimum setting temperature and is equal to or lower than the maximum setting temperature, switch the three-way valve to the side connecting with the guide pipe and,
when the measured temperature is lower than the minimum setting temperature, switch the three-way valve to the side connecting with the other pipe.

* * * * *